US009689244B2

(12) United States Patent
Kurkal-Siebert et al.

(10) Patent No.: US 9,689,244 B2
(45) Date of Patent: Jun. 27, 2017

(54) PROCESS FOR WATER WETTING OIL-WET SURFACES

(71) Applicant: BASF SE, Ludwigshafen (DE)

(72) Inventors: Vandana Kurkal-Siebert, Heidelberg (DE); Oetter Günter, Frankenthal (DE); Hans Georg Mainx, Leichlingen (DE); Sandra Mack, Korschenbroich (DE)

(73) Assignee: BASF SE, Ludwigshafen (DE)

( * ) Notice: Subject to any disclaimer, the term of this patent is extended or adjusted under 35 U.S.C. 154(b) by 459 days.

(21) Appl. No.: 13/900,133

(22) Filed: May 22, 2013

(65) Prior Publication Data

US 2013/0312975 A1 Nov. 28, 2013

Related U.S. Application Data (60) Provisional application No. 61/650,512, filed on May 23, 2012.

(51) Int. Cl.

| C09K 8/80 | (2006.01) |
|---|---|
| E21B 43/26 | (2006.01) |
| E21B 43/16 | (2006.01) |
| C09K 8/528 | (2006.01) |
| C09K 8/584 | (2006.01) |
| C09K 8/60 | (2006.01) |
| C09K 8/68 | (2006.01) |
| C09K 8/74 | (2006.01) |

(52) U.S. Cl.
CPC .............. *E21B 43/26* (2013.01); *C09K 8/528* (2013.01); *C09K 8/584* (2013.01); *C09K 8/602* (2013.01); *C09K 8/68* (2013.01); *C09K 8/74* (2013.01); *E21B 43/16* (2013.01)

(58) Field of Classification Search
CPC ........ E21B 43/16; E21B 43/164; E21B 43/26; E21B 43/20; E21B 43/40; E21B 43/168; E21B 43/24; E21B 43/2406; E21B 43/25; E21B 36/00; E21B 43/255; E21B 43/34; E21B 47/06; E21B 21/16; E21B 27/00; E21B 41/02; E21B 43/00; E21B 43/121; E21B 43/126; E21B 43/128; E21B 43/162; E21B 43/166; E21B 43/17; E21B 43/2401; E21B 43/2408; E21B 43/267; E21B 47/00; E21B 47/065; E21B 49/00; C09K 8/584; C09K 8/58; C09K 8/588; C09K 2208/10; C09K 8/594; C09K 8/68; C09K 8/52; C09K 8/524; C09K 8/70; C09K 8/92; C09K 2208/08; C09K 2208/24; C09K 2208/28; C09K 8/26; C09K 8/36; C09K 8/80

See application file for complete search history.

(56) References Cited

U.S. PATENT DOCUMENTS

| 2,893,990 | A | * | 7/1959 | Hass | ..................... B23K 5/06 424/55 |
|---|---|---|---|---|---|
| 3,102,114 | A | * | 8/1963 | Komori | ..................... A23G 1/56 424/49 |
| 4,016,932 | A | * | 4/1977 | Kalfoglou | .............. C09K 8/584 166/270 |
| 4,985,154 | A | | 1/1991 | Balzer et al. | |
| 7,256,160 | B2 | | 8/2007 | Crews | |
| 2006/0046948 | A1 | * | 3/2006 | Tang | ................... B01F 17/0092 510/470 |
| 2006/0047109 | A1 | * | 3/2006 | Schaefer | ............ B01F 17/0021 536/102 |
| 2007/0215347 | A1 | * | 9/2007 | Tang | ...................... C09K 8/584 166/263 |
| 2009/0264598 | A1 | | 10/2009 | Bittner et al. | |
| 2010/0163234 | A1 | | 7/2010 | Fuller et al. | |
| 2012/0157353 | A1 | * | 6/2012 | Breeden | ................... C09K 8/24 507/119 |

FOREIGN PATENT DOCUMENTS

| CA | 2088697 A1 | 2/1992 |
|---|---|---|
| CA | 2336027 A1 | 12/1999 |
| EP | 2072523 A1 | 6/2009 |
| EP | 2204358 A1 | 7/2010 |
| FR | 1244623 A | 10/1960 |
| WO | WO-92/02594 A1 | 2/1992 |
| WO | WO-9967017 A1 | 12/1999 |
| WO | WO-2006/026732 A1 | 3/2006 |
| WO | WO-2009/124922 A1 | 10/2009 |
| WO | WO-2010069518 A1 | 6/2010 |
| WO | WO-2011012164 A1 | 2/2011 |
| WO | WO-2011086360 A1 | 7/2011 |

OTHER PUBLICATIONS

Goddard et al, Cost effective surfactant formulations for improved oil recovery in carbonate reservoirs, DOE Project: DE-FC26-04NT15521 California Institute of Technology Final Report Oct. 2004-Mar. 2007, May 2007.*
U.S. Appl. No. 61/374,459.
U.S. Appl. No. 61/466,997.
U.S. Appl. No. 61/550,453.
U.S. Appl. No. 61/550,457.
International Search Report, International Application No. PCT/EP2013/059947, Aug. 8, 2013.
Salehi et al., "Mechanistic Study of Wettability Alteration Using Surfactants with Applications in Naturally Fractured Reservoirs", Langmuir, 2008, vol. 24, pp. 14099-14107.

(Continued)

*Primary Examiner* — Kumar R Bhushan
(74) *Attorney, Agent, or Firm* — Drinker Biddle & Reath LLP (57) ABSTRACT

Process for water-wetting oil-wet surfaces by applying an aqueous formulation comprising at least one wettability modifier which is a water-soluble ester of an alkoxylated saccharide to the oil-wet surface. The oil-wet surfaces may be any hydrophobic surfaces such as the rocks of subterranean oil-bearing formations.

20 Claims, 2 Drawing Sheets

(56) References Cited

OTHER PUBLICATIONS

Karimi et al., "Wettability Alteration in Carbonates Using Zirconium Oxide Nanofluids: EOR Implications", Energy & Fuels, 2012, vol. 26, pp. 1028-1036.

Wu et al., "Alkyl Polglycoside-Sorbitan Ester Formulations for Improved Oil Recovery", Tenside Surf. Det., 2010, vol. 47, No. 5. pp. 280-287.

* cited by examiner

PROCESS FOR WATER WETTING OIL-WET SURFACES

CROSS-REFERENCE TO RELATED APPLICATIONS

This application claims benefit (under 35 U.S.C. §119(e)) of U.S. Provisional Application 61/650,512, filed May 23, 2012, which is incorporated by reference.

BACKGROUND OF THE INVENTION

The present invention relates to a process for water-wetting oil-wet surfaces by applying an aqueous formulation comprising at least one wettability modifier which is a water-soluble ester of an alkoxylated saccharide to the oil-wet surface. The oil-wet surfaces may be any hydrophobic surfaces such as the rocks of subterranean oil-bearing formations.

In natural mineral oil deposits, mineral oil is present in the cavities of porous reservoir rocks which are sealed toward the surface of the earth by impervious top layers. The cavities may be very fine cavities, capillaries, pores or the like. Fine pore necks may, for example, have a diameter of only about 1 µm. As well as mineral oil, including fractions of natural gas, a deposit comprises water with a greater or less salt content.

In mineral oil production, a distinction is generally drawn between primary, secondary and tertiary production.

In primary production, the mineral oil flows, after commencement of drilling of the deposit, of its own accord through the borehole to the surface owing to the autogenous pressure of the deposit. However even in a best-case scenario, only a minor amount of mineral oil present, typically not more than approximately 10% in the deposit can be produced by primary production.

In secondary production, water may be injected into the deposit in order to maintain the pressure or to increase it again. Such a technique is known as water-flooding. It is the aim of water-flooding to force the mineral oil slowly through the cavities into the formation, proceeding from the injection borehole in the direction of the production borehole.

Techniques of tertiary oil production also known as enhanced oil recovery (EOR) include methods in which suitable chemicals are used as assistants for oil production. For instance, aqueous solutions comprising surfactants and/or thickening polymers may be injected into the formation in order to mobilize oil in the subterranean formation so that additional oil can be recovered from the formation.

One of the crucial points for a proper choice of suitable chemicals to enhance oil production is the nature of the inner surfaces of the mineral oil deposit.

Figure 1:
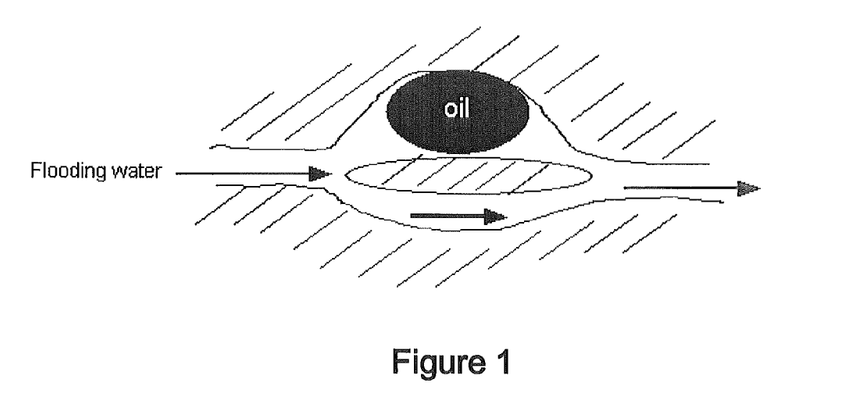
FIG. 1 Oil bearing formation with water-wet surface (schematically)

In subterranean oil reservoirs having more or less hydrophilic surfaces such as sandstone reservoirs the surfaces usually are water-wet and droplets of hydrophobic oil can be caught in the pores of the formation if their diameter is greater than the diameter of the capillaries following the pore in flow direction. Said situation is indicated schematically in FIG. 1. In such a case suitable surfactants may be used to overcome the capillary forces and decrease the interfacial tension of the oil-water interface so that the oil droplet can be deformed and can be driven out of the pores by the injected aqueous surfactant solution. Surfactants suitable for this technique should cause an ultra-low interfacial tension at the oil-water interface.

Figure 2:
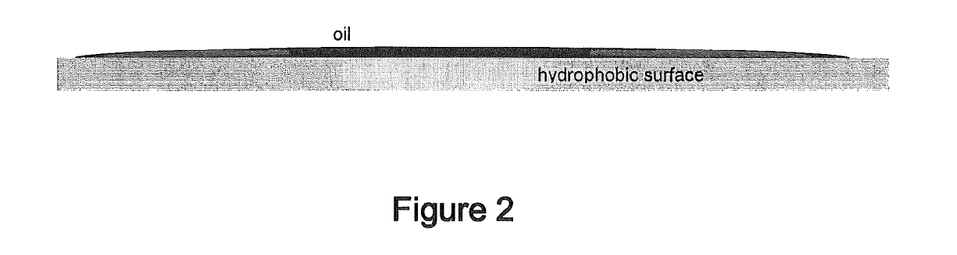
FIG. 2 Oil-bearing formation with oil-wet surface (schematically)

In subterranean oil reservoirs having more or less hydrophobic surfaces such as for example carbonate reservoirs oil may be absorbed as very thin film on the inner surfaces of the formation, i.e. the surfaces are oil-wet. This is indicated schematically in FIG. 2. The water-permeability of such reservoirs having oil-wet surfaces typically is low due to the negative capillary pressure of water so that already the efficiency of water-flooding is low. In order to enhance oil recovery it is necessary to modify the oil-wet surface into a water-wet one by detaching oil from the oil-wet surface.

It is known in the art to use wettability modifiers for certain techniques in course of oil production.

U.S. Pat. No. 7,256,160 B2 discloses fracturing fluids for hydraulic fracturing of subterranean formations which comprise water wetting control agents. Such wetting control agents may be for instance ethylenglycol monomethyl glycol ether, alkyl sulfates, alkyl sulfonates, or alkyl glucosides.

M. Salehi, S. J. Johnson, and J. Liang, Langmuir 2008, 24, 14099-14107 discuss the use of several surfactants such as surfactin, sodium laureth sulphate, and dodecyltrimethylammonium bromide as wettability modifiers for oilfield reservoirs.

US 2010/0163234 A1 discloses a method for treating subterranean formations by injecting a fluid into the formation which comprises a particulate and an organosilane $R_nSiX_{4-n}$ wherein R is an organic functional group, and X is halogen, alkoxy, or an acetoxygroup, and n is 1,2, or 3.

WO 2011/086360 A1 discloses treatment fluids for wetting control of multiple rock types which comprise a first surfactant having a charge, a second surfactant having an opposite charge and a compatilizer. The surfactants may be cationic surfactants such as alkyl ammonium chlorides and anionic surfactants such as alkyl ether sulfates and the compatilizer may be selected from various surfactants, including ethoxylated sorbitan fatty acid esters A. Karimi, Z. Fakhroueian, A. Bahramian, A. P. Khiabani, J. B. Darabad, R. Azin, and S. Arya, Energy & Fuels 2012, 26, 1028-1036 disclose the use of nanofluids comprising $ZrO_2$ nanoparticles and surface active components for wettability alteration in carbonates and for enhanced oil recovery. The formulation studied comprises surfactants based on sorbitane esters.

Several publications disclose the use of alkyl polyglucosides for oil field applications. Examples comprise WO 92/02594 A1, WO 2006/026732 A1, U.S. Pat. No. 4,985, 154, or WO 2009/124922.

Y. Wu, S. Iglauer, P. Shuler, Y. Tang, and W. A. Goddard, Tenside, Surfactants Detergents 47(5) (2010), 280-280 disclose formulations of alkyl polyglucosides and sorbitan esters for improved oil recovery.

Wettabilty modfiers for oilfield applications need to fulfil a number of requirements based on the specific conditions prevailing in subterranean oil formations such as high temperatures and the existence of reservoir water having a high salt content with additional challenge arising from the presence of divalent ions such as $Mg^{2+}$ or $Ca^{2+}$.

WO 2010/069518 A1 discloses a process for producing polyol esters by transesterification of polyols or their alkoxylation products. The reaction is carried out in the presence of reducing mineral acids or organic acids as catalysts. In particular, the process is suitable for making products based on heat-sensitive starting materials such as saccharose. Furthermore, WO 2010/069518 A1 discloses esters of ethoxylated and/or propoxylated dextrose, saccharose, maltose and maltotriose which were made available the first time using the new process. The publication discloses several uses of the polyol esters obtained, however not the use in oilfield applications.

BRIEF SUMMARY OF THE INVENTION

It is an object of the invention to provide an improved process for water wetting oil-wet surfaces, in particular oil-wet surfaces of subterranean oil-bearing formations.

Correspondingly, a process for water-wetting oil-wet surfaces has been found which comprises at least a step of contacting the oil-wet surface with an aqueous formulation comprising at least one water-soluble wettability modifier, wherein at least one of the wettability modifiers is an ester of alkyoxylated saccharide having the general formula Z—(—O—C(O)—$R^1$)$_n$ (I), wherein Z represents an alkoxylated mono-, di-, or trisaccharide moiety of pentoses and/or hexoses alkoxylated with from 4 to 80 alkylene oxide units selected from the group of ethylene oxide, propylene oxide, or butylene oxide units, with the proviso that at least 50% of the alkylene oxide units are ethylene oxide units, n is a number ≥1, and $R^1$ is an aliphatic linear or branched, saturated or unsaturated hydrocarbon moiety having from 6 to 30 carbon atoms.

In a preferred embodiment of the invention, the process is applied in course of oil production.

In another preferred embodiment of the invention, the process is a process for enhanced oil recovery wherein the aqueous formulation is injected into the subterranean oil-bearing formation comprising oil and formation water through an injection well, the injected water flows through the subterranean formation towards a production well, thereby detaching oil from the oil-wet surfaces of the formation, and producing a mixture comprising oil and water from the formation through a production well.

Surprisingly, it has been found that the esters of alkoxylated saccharides used as wettability modifiers have an excellent performance at temperatures above 50° C. and at high salinity.

BRIEF DESCRIPTION OF THE FIGURES

List of Figures

A DETAILED DESCRIPTION OF THE INVENTION

With regard to the invention, the following should be stated specifically:

Wettability Modifiers Used in the Process

The wettability-modifiers used in the process of the present invention are water-soluble fatty acid esters of alkoxylated mono-, di-, or trisaccharides.

The monosaccharides are pentoses or hexoses, preferably hexoses and in the same manner the units of the di- or trisaccharides are pentose units and/or hexose units, preferably hexose units. Accordingly, the mono-, di-, or trisaccharides contain from 5 to 18 carbon atoms, preferably from 6 to 18 carbon atoms. The monosaccharides may be aldoses and/or ketoses. Preferably, the saccharides are mono- or disaccharides and very preferably, the saccharides are disaccharides.

Examples of suitable mono-, di-, or trisaccharides include monosaccharides such as arabinose, ribose, xylose, glucose, mannose, galactose, fructose, disaccharides such as maltose (2 glucose units), lactose (one galactose unit+one glucose unit) or saccharose (one glucose unit+one fructose unit) or trisaccharides such as maltotriose (3 glucose units).

Preferred saccharides are glucose, saccharose, maltose, and maltotriose and particularly preferred is saccharose.

The mono-, di-, or trisaccharides are alkoxylated with from 4 to 80 alkylene oxide units selected from the group of ethylene oxide, propylene oxide, and butylene oxide units, preferably from the group of ethylene oxide and propylene oxide units, with the proviso that at least 50% of the total number of alkylene oxide units are ethylene oxide units. Preferably, at least 70% and very preferably at least 90% of the alkylene oxide units are ethylene oxide units and in the most preferred embodiment only ethylene oxide units are used. Using other alkylene oxides units besides ethylene oxide units may be used to fine tune the hydrophilicity of the alkoxylated saccharide esters to be used. The alkoxylation products may show a blockwise or statistical distribution of the alkylene oxide units.

Preferably, the mono-, di-, or trisaccharides are alkoxylated with from 8 to 50 alkylene oxide units, more preferably with from 10 to 45 alkylene oxide units and most preferably with from 12 to 40 alkylene oxide units.

The fatty acid esters may be represented schematically by the formula Z—(—O—C(O)—$R^1$)$_n$ (I). In formula (I) Z represents an alkoxylated mono-, di-, or trisaccharide moiety as described above, n the number of ester groups, and $R^1$ an aliphatic linear or branched, saturated or unsaturated hydrocarbon moiety having from 6 to 30 carbon atoms, preferably from 8 to 30 carbon atoms, more preferably from 8 to 22 carbon atoms and most preferably from 12 to 18 carbon atoms. $R^1$ may optionally be substituted by OH-groups. If $R^1$ is an unsaturated aliphatic residue the number of double bonds preferably is from 1 to 3 double. n represents the number of ester groups in the molecule and has a number ≥1. It goes without saying that n cannot exceed the number of OH-groups present in the saccharides used, i.e. in case of a trisaccharide of three hexoses such as maltotriose n cannot exceed 11, in case of a disaccharide of two hexoses saccharose the number cannot exceed 8. In other words, n is from 1 to 11. Preferably, n is from 1 to 4 and most preferably n is 1 or 2.

Examples of ester groups $R^1$—C(O)—O— comprise ester groups derived from lauric acid, myrystic acid, palmitic acid, palmoleic acid, stearic acid, isostearic acid, oleic acid, elaidinic acid, linoleic acid, conjugated linoleic acid, linolenic acid, 12-hydroxy stearic acid, ricinoleic acid, gadoleic acid, arachidonic acid, behenic acid, and erucic acid.

The wettability modifiers to be used according to the invention are water-soluble. They may be miscible with water at all proportions, however for the process it is sufficient that the wettability modifiers are soluble at the intended concentration of use and the given salinity of the water. In general, the wettability modifier should have a water solubility of at least 0.1% by weight, preferably at least 1% by weight at 20° C. in the aqueous formulation to be used for the process according to the invention.

The kind and number of alkylene oxide units as well as the kind and number of ester groups may be selected by the skilled artisan according to the requirements of the process. In any case it needs to be ensured that the wettability modifiers are water soluble at the concentration used in the process. The skilled artisan knows how to deal with that problem. The more ester groups are used and the larger $R^1$ the more hydrophobic the ester and the more ethylene oxide groups the more hydrophilic the ester. Consequently, the greater the number of ester groups the greater should be also the number of ethylene oxide units in order to ensure sufficient water solubility.

Preferred water-soluble wettability modifiers for use in the process of the present invention are esters based on alkoxylated saccharose. Preferably, saccharose is alkoxylated with from 8 to 50 ethylene and/or propylene oxide units, more preferably with from 12 to 45 ethylene and/or propylene oxide units and most preferably with from 15 to 40 ethylene oxide and/or propylene units with the proviso that at least 50% of the total number of alkylene oxide units are ethylene oxide units. Preferably, at least 70% and very preferably at least 90% of the alkylene oxide units are ethylene oxide units and in the most preferred embodiment only ethylene oxide units are used. Preferably mono- or diesters are used, i.e. n is 1 or 2, and $R^1$ as defined above has 8 to 22 carbon atoms and more preferably from 12 to 18 carbon atoms.

Particularly preferred for the present process are monoesters of alkoxylated saccharose wherein the alkoxylated saccharose comprises from 15 to 25 ethylene oxide units, for example about 20 ethylene oxide units, and $R^1$ as defined above has 12 to 18 carbon atoms, preferably 16 to 18 carbon atoms, e.g. saccharose*20 EO-monooleate.

Also particularly preferred for the present process are diesters of alkoxylated saccharose wherein the alkoxylated saccharose comprises from 25 to 45 ethylene oxide units, for example about 30 to 40 ethylene oxide units, and $R^1$ as defined above has 10 to 18 carbon atoms, preferably 12 to 14 carbon atoms, e.g. saccharose*40 EO-dilaurate.

Manufacture of the Wettability Modifiers

For the manufacture of the esters in a first step mono-, di-, or trisaccharides are alkoxylated according to procedures known to the skilled artisan.

In a preferred embodiment of the invention the alkoxylation may be performed according to the procedure disclosed in EP 2 072 523 A1, i.e. by alkoxylating the saccharides with ethylene oxide and optionally higher alkylene oxides in aqueous solution at 90° C. to 160° C., preferably 100° C. to 140° C. and at a pressure of 1 bar to 5 bar. As catalysts hydroxides such as potassium hydroxide or sodium hydroxide may be used. After the reaction, the reactor is cooled and the alkaline catalyst neutralized using an organic acid, for example lactic acid. Some polyalkyleneoxides may be formed as a byproduct of the alkoxylation but the procedure disclosed by EP 2 072 523 A1 ensures that their amount is only low.

In a second step the alkoxylated polysaccharides are esterified in order to obtain the above-mentioned esters. Techniques for esterification are known to the skilled artisan.

In a preferred embodiment the esterification is performed by transesterification, preferably according to the procedures described in WO 2010/069518 A1.

In general, transesterification means the reaction of an alcohol ROH with an ester R'COOR" in the following manner: ROH+R'COOR"→R'COOR+R"OH. R"OH usually is a highly voilatile alcohol which can be easily removed from the reactor. According to the procedure described in WO 2010/069518 A1 the transesterification is carried out in the presence of alkali or earth-alkali salts of reducing acids as a catalyst.

Preferably, the transesterification catalysts may be selected from the group consisting of
(i) alkali- and/or earth-alkali salts of sulfuric or sulfonic acids with an oxidation value of sulfur of less than 6,
(ii) alkali- and/or earth-alkali salts of phosphoric or phosphonic acids with an oxidation value of phosphor of less than 5.

Typical examples comprise alkali- and/or earth-alkali salts of sulfurous acid, dithionic acid, sulfinic acid and organic sulfinic acid, phosphorous acid, diphosphorous acid, hypophosphorous acid, and hypodiphosphorous acid. Preferred salts are potassium salts.

Using the salts of reducing acids permits to conduct the transesterification under milder conditions, in particular lower temperatures and neutral pH value. Such conditions are in particular suitable for transesterification of the somewhat heat-sensitive saccharides to be used in the present invention.

Suitable fatty acid esters for reaction with the alkoxylated saccharides are of the formula $R^1CO-OR^2$ (II), wherein $R^1$ has the meaning as defined above and $R^2$ represents an alkyl radical having 1 to about 6 carbon atoms or the residue of glycerol. Perferably, $R^2$ stands for a methyl group. The fatty acid esters suitable to be used in the inventive process therefore represent either alkyl esters or (mono/di/tri)glycerides.

Typical examples of suitable esters $R^1CO-OR^2$ (II) may be chosen from methyl, ethyl, propyl, butyl, pentyl or hexyl esters, preferably the methyl esters of capronic acid, caprylic acid, caprinic acid, lauric acid, myristic acid, palmitic acid, palmoleic acid, stearic acid, isostearic acid, oleic acid, elaidinic acid, linoleic acic, conjugated linoleic acid, linolenic acid, 12-hydroxy stearic acid, ricinoleic acid, gadoleic acid, arachidonic acid, behenic acid, Erucic acid and their technical mixtures like for example tallow acid, coco fatty acid, palm fatty acid, sunflower acid, or soy acid. Instead of the alkyl esters mono-, di- and/or triglycerides of the same fatty acids can also be used for transesterification. Finally, it is also possible to use natural fats and oils, for example sunflower or soy oil for the same purpose.

The transesterification may be conducted in the usual manner known from organic chemistry. Typically the ester (II) is used in excess. The salts used as catalysts may be prepared in-situ:

Stoichiometrical amounts of mineral acid and alkali hydroxide are added to a mixture of the alkoxylated saccharide and the ester (II).

The catalysts may be used in concentrations of about 0.05 to about 1% by weight, preferably about 0.1 to about 0.5% by weight calculated on the starting materials for transesterification. The reaction may be preferably performed at a pH-value of from 6 to 8.5. Once the catalyst has been added, the mixture is heated up to the final temperature either under nitrogen or vacuum, depending on the reactants. Suitable reaction temperatures are in the range of about 120 to about 200° C., preferably about 150 to about 180° C. It is preferred to conduct the transesterification under reduced pressure, for example 1 to about 300 mbar and preferably about 10 to about 100 mbar.

Aqueous Formulations

For the process according to the present invention an aqueous formulation comprising at least one wettability modifier of the general formula $Z-(-O-C(O)-R^1)_n$ (I) as described in detail above is used. Of course, two or more wettability modifiers of formula (I) may be used.

Besides water the aqueous formulation may also comprise organic solvents miscible with water. Examples of such solvents comprise alcohols such as ethanol, n-propanol, i-propanol or butyldiglycol. If organic solvents are present their amount should not exceed 50% by weight with respect to all solvents present in the formulation, preferably it should not exceed 25% by weight. In a preferred embodiment of the invention only water is used as solvent.

The water used may be saline water comprising dissolved salts. Examples of salts comprise halogenides, in particular chlorides, sulfates, borates of mono- or divalent cations such as $Li^+$, $Na^+$, $K^+$, $Mg^{2+}$, $Ca^{2+}$, $Sr^{2+}$, or $Ba^{2+}$. The salinity of the water may be from 10,000 ppm to 230,000 ppm.

The concentration of the wettability modifiers according to formula (I) may be from 0.01% to 10% by weight with respect to the total of all constituents of the aqueous formulation, preferably from 0.1% to 5% by weight and very preferably from 0.5% to 5% by weight.

The aqueous formulation may comprise further constituents such as anionic, cationic, nonionic and amphoteric surfactants as well as polymers, inorganic salts like sodium chloride or potassium chloride and alkali like sodium hydroxide or sodium hydrogen carbonate. Of course, also wettability modifiers different from those of formula (I) may be used. The amount of each of such further constituents may be from 0.01% to 10% by weight.

The aqueous formulation may be made by mixing water, the wettability modifier according to the present invention and optionally further components. The water used may be fresh water but also sea water or formation water may be used, i.e. more or less saline water. It is one of the advantages of the wettability modifiers used for the process according to the invention that they show good results in saline water.

Usually, the wettability modifier is provided as concentrated aqueous solution which is used to mix the aqueous formulation to be used directly at the location of use, e.g. on the oilfield.

Process for Water Wetting Oil-Wet Surfaces

The process for water-wetting oil-wet surfaces according to the present invention comprises at least the step of contacting an oil-wet surface with an aqueous formulation comprising at least a water-soluble wettability modifier of formula (I) as described above.

The term "oil" as used herein in usual manner stands for organic liquids which are not soluble in water and which have a high boiling point, e.g. a boiling point of not less than 150° C., preferably not less than 200° C. Oils may be oils from natural sources or synthetic oils. Oils preferred within the scope of the present invention are crude oils.

It goes without saying for the skilled artisan that a surface which is oil-wet will be more or less hydrophobic. The degree of hydrophobicity may be determined in the usual manner by measuring the contact angle of the oil on the surface. Usually, the contact angle should be from 0° to 30°, preferably from 0° to 10° and most preferably about 0°. The oil may cover the surface completely, for instance it may form a continuous film on the surface or only a part of the surface may be covered with oil.

The surface may be any kind of surface which can be wetted with oils, such as crude oil, synthetic oil or oily formulations, e.g. the surfaces of hydrophobic polymers, such as polyethylene surfaces or steel or alloy surfaces used in well drilling and in pipelines. In particular, oil-wet surfaces include any surfaces which are or may come into contact with any kind of oily formulation or crude oil in the process of producing and transporting oil, such as the surfaces of subterranean oil-bearing formations, in particular the inner surfaces of pores, cavities, and capillaries of the subterranean, oil-bearing formation, wellbores with or without casing, equipment or installations for the production and transport of crude oils. Furthermore, oil-wet surfaces include the surfaces of scales deposited on other surfaces. Scales may be carbonate scales, such as calcium or magnesium carbonate scales, sulfate scales such as calcium sulfate scales. In a preferred embodiment of the invention such scales are deposited on surfaces on equipment and installations for the production and transport of crude oil, e.g. on the surface of casings, pumping rods, or pipelines.

In a preferred embodiment of the invention oil-wet surfaces may be the inner surfaces of subterranean oil-bearing formations, in particular formations which comprise carbonate rocks and/or formations which consist of carbonate rocks, in particular calcite and dolomite rocks.

For the process of the present invention the oil-wet surface is contacted with an aqueous formulation comprising at least a water-soluble wettability modifier as described above. It goes without saying that the technique for contacting oil-wet surfaces with the aqueous formulation depends on the nature of the object having an oil-wet surface, for instance whether the object has an inner or an outer surface or whether it is mobile or not. By the way of example, contacting may be done by spraying the formulation onto the surface or by submerging an object having an oil-wet surface into the aqueous formulation. The latter of course is only possible for surfaces of mobile objects. If the surfaces are inner surfaces of devices the formulation may be poured or injected into such device.

If the surfaces are oil-wet surfaces of subterranean formations, the aqueous formulation may be injected into the subterranean formation. Injection may be carried out by injecting the aqueous formulation into injections wells or into production wells drilled into the formation.

The injection is performed by the skilled artisan at a pressure sufficient to allow the aqueous formulation to penetrate into the formation.

After contacting the oil-wet surface with the aqueous formulation it is advisable to allow the aqueous formulation to act on the surface for some time. It goes without saying for the skilled artisan that the time may depend on factors including the temperature, the concentration of the components in the formulation, the oil or the nature of the surface. The time of the treatment may vary from seconds to several hours.

The temperature in course of the treatment of the oil-wet surface may be from 20° C. to 150° C., preferably from 40° C. to 100° C. In some case the temperature may be selected by the skilled artisan, e.g. by selecting a certain temperature for the aqueous formulation. In the case of subterranean formations the aqueous formulation may be injected into the formation at room temperature or at higher temperatures and after injection into the formation the temperature of the aqueous formulation injected will approach the formation temperature.

Figure 3:
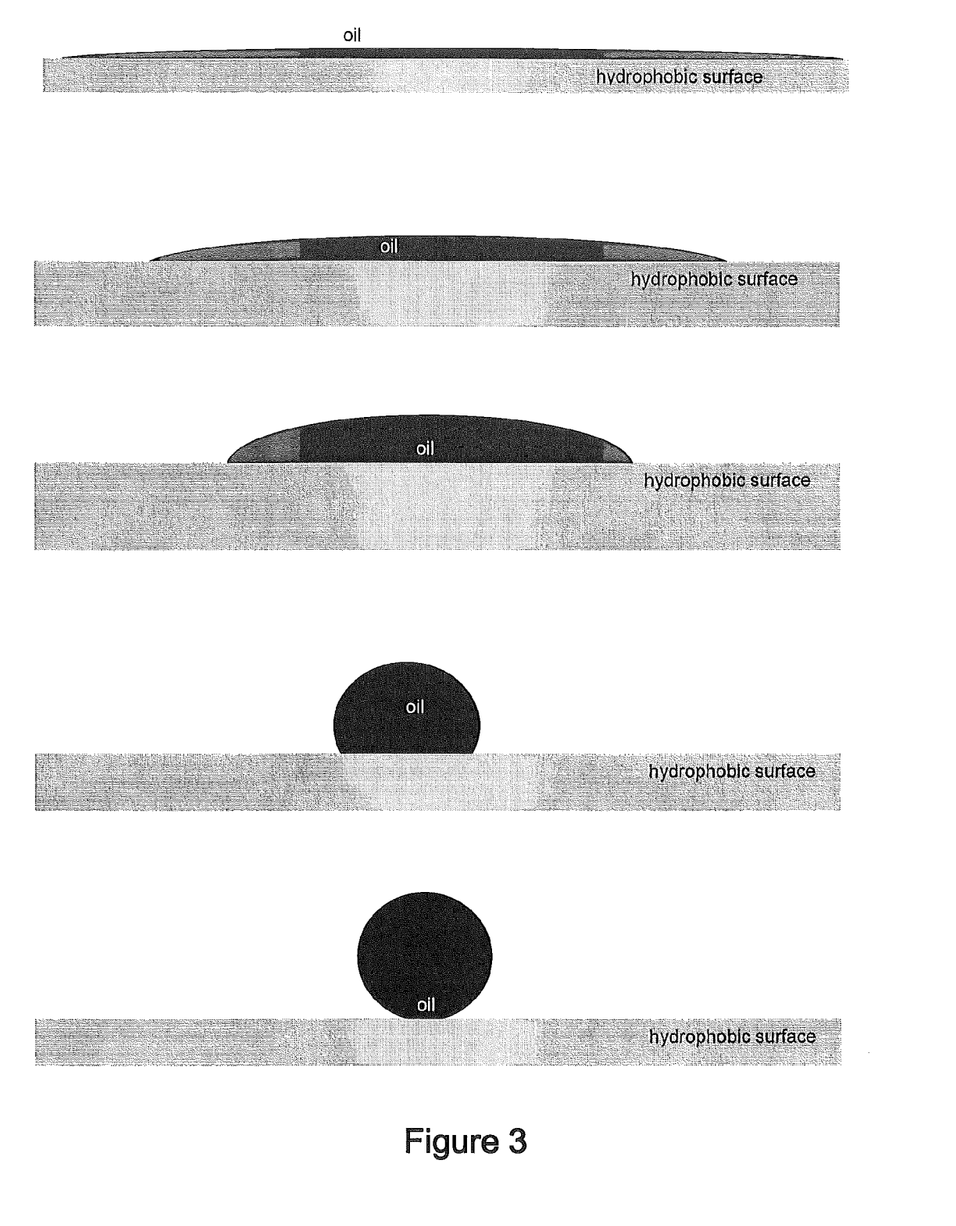
FIG. 3 Detachment of oil from an oil-wet surface in course of water-wetting an oil-wet surface (schematically).

In course of the treatment of the oil-wet surface the surface becomes more hydrophilic. This process can be monitored by contact angle measurements. The contact angle between the surface and the oil becomes larger and larger and finally drops of oil may become detached form the surface. Said process is illustrated schematically in FIG. 3.

In preferred embodiments of the invention, the process according to the invention is applied in course of oil production. In such processes of oil production it is usually combined with further process steps.

In a first preferred embodiment of the process according to the invention the oil-wet surfaces are surfaces of the rocks of subterranean oil-bearing formations comprising oil and formation water. Preferably, rocks of the subterranean oil-bearing formation comprise carbonate rocks. The formation water usually is brine and its salinity may be from 10,000 ppm to 230,000 ppm. The temperature of the formation may be from 20° C. to 150° C., preferably from 40° C. to 100° C. For executing the first preferred embodiment an aqueous formulation comprising at least a wettability modifier as described above is injected into the subterranean formation.

In a second preferred embodiment the process is a process for enhanced oil recovery. The oil-wet surfaces are surfaces of the rocks of a subterranean oil-bearing formations comprising oil and formation water. Preferably, rocks of the subterranean oil-bearing formation comprise carbonate rocks. The formation water usually is brine and its salinity may be from 10,000 ppm to 230,000 ppm. The temperature of the formation may be from 20° C. to 150° C., preferably from 40° C. to 100° C. The oil-bearing formation comprises at least one injection well and at least one production well. The aqueous formulation is injected into the subterranean formation through at least one injection well under a pressure sufficient so that the injected water flows through the subterranean formation towards at least one production well. Thereby it comes into contact with oil-wet surfaces of the formation and under the influence of the wettability modifier the surface becomes more and more water-wet. As a consequence spontaneous imbibition of the water into the capillaries of the carbonate rock due to capillary forces takes place and oil is pressed out of the capillaries. The mixture comprising oil and water from the formation flows to the production well where it can be extracted to the surface.

In a following step the produced mixture of crude oil and formation water is separated in the usual manner into a phase of crude oil and of formation water. This may be done using usual equipment and optionally usual demulsifiers as process aids.

In a preferred embodiment of the process for enhanced oil recovery the separated saline formation water may be used for making the aqueous formulation comprising the wettability modifier. Only formation water may be used or saline water mixed with fresh water or sea water may be used. The aqueous formulation comprising salts may thereafter be injected through the injection well into the formation thereby recycling at least a part of the formation water. This is an economic advantage in particular for oil production on land where it is difficult to dispose formation water.

In a third preferred embodiment the process is a hydraulic fracturing process. The aqueous formulation is injected into the subterranean oil-bearing formation through a production well. Preferably, rocks of the subterranean oil-bearing formation comprise carbonate rocks. The temperature of the formation and the salinity of the formation water may be as described above. In course of the treatment of the formation oil-wet surfaces become water-wetted. In a second step, an aqueous fracturing fluid comprising thickening components is injected through the production well. The injection is done at a pressure sufficient to fracture the rocks of the formation. Said fractures are usually formed in a zone around the production well.

Through the fractures formed oil may flow from the formation to the production well thus allowing an increased oil production.

The process of fracturing and suitable fracturing fluids for use in fracturing are known to the skilled artisan. Suitable examples of fracturing fluids are disclosed in WO 2011/012164 A1. Besides thickening components, fracturing fluids may comprise so called proppants. Proppants are small hard particles which cause that formed fractures do not close after removing the pressure. The step of water wetting oil-wet surfaces before injecting the fracturing fluid improves the penetration of the aqueous fracturing fluid into the formation thereby improving the process of forming fractures.

In a fourth preferred embodiment the process is an acidizing process. The aqueous formulation is injected into the subterranean oil-bearing formation through a production well. Preferably, rocks of the subterranean oil-bearing formation comprise carbonate rocks. The temperature of the formation and the salinity of the formation water may be as described above. In course of the treatment of the formation oil-wet surfaces become water-wetted. In a second step, an aqueous acid formulation is injected through the production well. The acid dissolves scale and may form new cavities, pores and the like in the formation thereby creating new channels for the oil to flow from the formation to the production well thus increasing oil production.

In a fifth preferred embodiment the process is a process for the removal of scale in course of oil-production. The oil-wet surfaces are the surfaces of scale deposited in an oil-bearing formation and/or a wellbore and/or oil production equipment. In a first step the oil-surfaces of the scale is treated with the aqueous formulation comprising a wettability modifier and the oil-wet surfaces become water wet. In a second step the scale is treated with an aqueous formulation comprising at least one scale inhibitor thereby removing or at least reducing scale. Water-wetting the surfaces before treating with the scale inhibitor significantly improves the efficiency of the scale removal.

The invention is illustrated in detail by the examples which follow.

In the examples, the following wettability modifiers were studied:

| Compound | Chemical description |
|---|---|
| S1 | Saccharose* 20 EO monoester with $C_{16}/C_{18}$ fatty acid |
| S2 | Saccharose * 40 EO diester with $C_{12}/C_{18}$ fatty acid |

EO = ethylene oxide

Step 1: Alkoxylation

For the synthesis of the compounds saccharose ethoxylated with 20 ethylene oxide units (20 moles ethylene oxide per 1 mole saccharose) and saccharose ethoxylated with 40 moles ethylene oxide was used. The alkoxylation was performed according to the procedure disclosed by EP 2 072 523 A1.

General Procedure:

An almost saturated solution of saccharose in water and 0.5% (calculated on educts) of an aqueous potassium hydroxide solution (50% by weight) are placed in a stirred autoclave. Once the reactor was three times evacuated and purged with nitrogen to remove all traces of oxygen, the mixture is heated to about 125° C. and within about 3.5 h the calculated amount of ethylene oxide is added, while the pressure should rise to about 5.5 bars. Subsequently the mixture is left for another 30 min for post reaction, maintaining the temperature at about 130° C. Finally, the reactor has to be cooled down to room temperature, vacuum is broken and the pH of the products should be adjusted to about 7 by adding a lactic acid solution. The liquid thus obtained comprises ethoxylated saccharose and water. At higher ethoxylation degrees, some polyethylene glycol may be formed as well.

Step 2: Transesterification

The esters were manufactured by transesterification of the ethoxylated saccharose in the presence of potassium hypophosphite as catalyst according to the procedures described in WO 2010/069518 A1, in particular example 1. For compound 1, a technical grade $C_{16}/C_{18}$ fatty acid methyl ester was used for transesterification and for compound 2 a technical lauric oil based $C_{12}/C_{18}$ fatty acid methyl ester (peak $C_{12}/C_{14}$) was used.

General Procedure:

0.5 mol alkoxylated saccharose is mixed with the calculated amount of methyl ester and 15 g of a 25% solution of potassium hypophosphite. The mixture is set under a 300 mbar vacuum and heated up slowly under stirring to 180° C. After the removal of the water (deriving from the ethoxylated saccharose) the reaction starts vigorously at a temperature of about 140-150° C. After the removal of the first large amount of methanol the vacuum is slowly reduced to <1 mbar and the reaction mixture is kept under these conditions for another 3-4 hours. After finished reaction time the final ester is cooled down and can be used as is without further treatment.

Application Tests

Solubility Tests:

Solubility tests revealed that both compounds S1 and S2 form clear solutions at a concentration of 1% by wt. in water having a salinity of 10.000 ppm and 100.000 ppm for temperatures of at least 95° C.

For comparative purposes, two conventional surfactants were tested at a concentration of 1% in water having a salinity of 50.000 ppm NaCl and in the usual manner their cloud point was determined.

$C_{13}$-alcohol+20 EO Cloud point of 86° C.
$C_{16/18}$-alcohol+80 EO Cloud point of 87° C.

Surface Tension (ST) and Critical Micelle Formation Concentration (cmc)

The surface tension was measured as a function of the concentration of the surface active components using the DuNouy ring method (according to Din 53914). The critical micelle formation concentration (cmc) was derived in the usual manner from the measurement graph.

In order to simulate the prevailing conditions in subterranean formations measurements were performed at 25° C. and at 60° C. in water having a salinity of 10.000 ppm and 100.000 ppm. The salts used were NaCl and $CaCl_2$ at a weight ratio of 9:1 $NaCl/CaCl_2$.

The results are summarized in table 1.

Interfacial Tension (IFT)

The interfacial tension between aqueous solutions of tested compounds and an oil phase were measured with a spinning drop tensiometer (DataPhysics). As the composition of crude oils may vary decane, dodecane, and hexadecane were used as model oils in order to study the range of application of the tested compounds. Tests were performed in water having a salinity of 10.000 ppm and 100.000 ppm ($NaCl/CaCl_2$ at a weight ratio of 9:1) and also at 25° C. and at 60° C. The results are summarized in table 1.

Modification of the Wettability of Rocks

Polyethylene platelets (3 cm×2 cm) were use as hydrophobic model surfaces for oil wet rocks. As a first step, 5 μl decane or 5 μl dodecane were applied to the polyethylene platelets. The hydrophobic liquids spread on the hydrophobic surface. The contact angle between the oil and the polyethylene surface was measured using a usual contact angle measuring device (DataPhysics) and consequently a value of 0° was obtained. The oil wet platelets were submerged into an aqueous solution of 1 g/l by weight of the compound to be tested. Tests were performed in water having a salinity of 10.000 ppm and 100.000 ppm ($NaCl/CaCl_2$ at a weight ratio of 9:1) and also at 25° C. and at 60° C. The contact angle between oil and the polyethylene surface was measured as function of time. Furthermore, it was inspected visually whether oil droplets became detached from the surface. The results are summarized in table 2.

TABLE 1

Tests of cmc, IFT, and ST

| Surfactant | T [°C.] | Brine conc. [ppm] | cmc [g/l] | ST [mN/m] At 1 g/l | IFT [mN/m] after 10 min without sample decane | IFT [mN/m] after 60 min 1 g/l of sample in aqueous phase | | |
|---|---|---|---|---|---|---|---|---|
| | | | | | | decane | docecane | hexadecane |
| S1 | 25 | 10,000 | 0.03 | 33.7 | 38 | 3.9 | 2.9 | 4.0 |
| S1 | 60 | 10,000 | 0.03 | 29.6 | 46 | 0.45 | 0.19 | 0.55 |
| S1 | 25 | 100,000 | 0.02 | 34.5 | 31 | 2.4 | — | — |
| S1 | 60 | 100,000 | 0.02 | 29.1 | 48 | 1.2 | — | — |
| S2 | 25 | 10,000 | 0.03 | 34.6 | 38 | 2.3 | 2.0 | 2.2 |
| S2 | 60 | 10,000 | 0.04 | 27.7 | 46 | 0.46 | 0.34 | 0.40 |
| S2 | 25 | 100,000 | 0.03 | 34.6 | 31 | 2.1 | — | — |
| S2 | 60 | 100,000 | 0.02 | 28.3 | 48 | 0.36 | — | — | cmc: Critical micelle formation concentration
Brine conc.: Concentration of brine NaCl/CaCl₂ (9:1)
ST: Surface tension
IFT: Interfacial tension

TABLE 2

Wettability modification using surfactant S1 at 25° C.
(polyethylene platelets, oil: dodecane, brine NaCl/CaCl₂ (9:1))

| | Contact angle [°] | | | |
|---|---|---|---|---|
| Time [min] | Brine conc. 10,000 ppm without S1 | Brine conc. 10,000 ppm + 1 g/l S1 | Brine conc. 100,000 ppm without S1 | Brine conc. 100,000 ppm + 1 g/l S1 |
| 0 | 0 | 6 | 0 | 7 |
| 30 | 0 | 13 | 0 | 26 |
| 45 | 0 | 14 | 0 | 74 |
| 60 | 0 | 17 | 0 | oil already detached |
| 90 | 0 | 22 | 0 | — |
| 180 | 0 | beginning detachment of oil | 0 | — |

TABLE 3

Wettability modification using surfactant S1 at 60° C.
(polyethylene platelets, oil: dodecane, brine NaCl/CaCl$_2$ (9:1))

| | Contact angle [°] | | | |
|---|---|---|---|---|
| Time [min] | Brine conc. 10,000 ppm without S1 | Brine conc. 10,000 ppm + 1 g/l S1 | Brine conc. 100,000 ppm without S1 | Brine conc. 100,000 ppm + 1 g/l S1 |
| 0 | 0 | —[1] | 0 | oil already detached after 2 min |
| 30 | 0 | —[1] | 0 | — |
| 45 | 0 | —[1] | 0 | — |
| 60 | 0 | beginning detachment of oil | 0 | — |

[1]No definite value due to fluctuations of the measured numbers

Table 1 shows that the wettability modifier S1 has a low critical micelle formation concentration (cmc), i.e. it is already surface active at low concentrations. Furthermore, the cmc is 0.03 g/l at 25° C. and at 60° C. (at a salinity of 10,000 ppm) and 0.02 g/l at 25° C. and at 60° C. (at a salinity of 100,000 ppm), i.e. the cmc is not depending on the temperature in the studied range. Said behavior is advantageous for use in subterranean oil-bearing formations which might not have a constant formation temperature but there may be temperature gradients. In particular, temperature gradients may be caused by ongoing water-flooding a formation. In the vicinity of the injection well the temperature usually becomes lowered. In the opposite manner, ongoing steam-flooding usually increases the temperature in the vicinity of the injection well. Also the dependence of the cmc on the salinity is not too pronounced. Such a behavior also is advantageous in oil formations, e.g. when fresh water has been used for making the aqueous formulation and later the formulation comes into contact with saline water.

The wettability modifier S2 has a similar behavior as compared to S1.

The interfacial tension (IFT) between water and hydrocarbons of different chain lengths decreases significantly by addition of the wettability modifier S1. The different hydrocarbons serve to study the influence of different types of oil. There is no strong influence of the nature of the hydrocarbon used which also is advantageous for oilfield uses.

Table 2 demonstrates the performance of the wettability modifier S1 for water wetting oil-wet surfaces. Without wettability modifier no oil is detached from the surface. With the wettability modifiers used according to the present invention the contact angle of the oil on the polyethylene surface increases over time and finally oil becomes detached from the surface. The detachment of oil is quicker at 60° C. than at 25° C. and it is quicker at a brine concentration of 100,000 ppm than at 10,000 ppm. At 60° C. and at 1000,000 ppm the oil is already detached from the surface after only 2 min of contact. These experimental data strongly support the suitability of the wettability modifiers of the present invention for applications in the oilfield.

The invention claimed is:

1. A process for water-wetting an oil-wet surface comprising a step of contacting the oil-wet surface with an aqueous formulation comprising an alkyoxylated disaccharide,
   wherein the oil-wet surface is a surface of a rock of subterranean oil-bearing formations comprising oil and formation water having a salinity of from 10,000 ppm to 230,000 ppm, and wherein the aqueous formulation is injected into the subterranean formation,
   the alkoxylated disaccharide is of formula (I)

$$Z—(—O—C(O)—R^1)_n \quad (I)$$

wherein
   Z represents an alkoxylated saccharose
      with from 4 to 80 alkylene units of ethylene oxide, propylene oxide, or butylene oxide units, with the proviso that at least 50% of the alkylene oxide units are ethylene oxide units, n is a number ≥1, and
   $R^1$ is an aliphatic linear or branched, saturated or unsaturated hydrocarbon moiety having from 6 to 30 carbon atoms, optionally substituted with OH-groups,
   and
   wherein the concentration of the alkoxylated disaccharide in the aqueous formulation is from 0.01% by weight to 10% by weight.

2. The process according to claim 1, wherein the alkoxylated saccharose includes from 8 to 50 ethylene oxide, propylene oxide units, or ethylene oxide and propylene oxide units, and n is a number of from 1 to 4.

3. The process according to claim 1, wherein the alkoxylated saccharose includes from 12 to 45 ethylene oxide, propylene oxide units, or ethylene oxide and propylene oxide units, with the proviso that at least 70% of the units are ethylene oxide units, and n is a number of 1 or 2.

4. The process according to claim 3, wherein the concentration of the alkoxylated disaccharide in the aqueous formulation is from 0.1% to 5% by weight.

5. The process according to claim 1, wherein the process is applied in course of oil production.

6. The process according to claim 4, wherein the process is applied in course of oil production.

7. The process according to claim 1, wherein the rock of the subterranean oil-bearing formation comprises a carbonate rock.

8. The process according to claim 1, wherein the process is a process for enhanced oil recovery, wherein injecting the aqueous formulation into the subterranean oil-bearing formations is through an injection well, wherein the injected water flows through the subterranean formation towards a production well, detaches oil from the oil-wet surface of the subterranean formation, and produces a mixture comprising oil and water from the subterranean formation through a production well.

9. The process according to claim 1, wherein the temperature of the subterranean formation is from 20° C. to 150° C.

10. The process according to claim 1, wherein the temperature of the subterranean formation is from 40° C. to 100° C.

11. The process according to claim 8, further comprising separating the oil-water mixture produced from the subterranean formation into an oil phase and a water phase, wherein the water is used for making the aqueous formulation comprising the wettability modifier and the aqueous formulation is injected through the injection well into the formation.

12. The process according to claim 1, wherein the process is a hydraulic fracturing process further comprising injecting the aqueous formulation into the subterranean oil-bearing formation through a production well, followed by injecting an aqueous fracturing fluid comprising at least thickening components at a pressure sufficient to fracture the rocks of the formation.

13. The process according to claim 1, wherein the process is an acidizing process further comprising injecting the aqueous formulation into the subterranean oil-bearing formation through a production well, followed injecting an aqueous acid formulation.

14. The process according to claim 1, wherein n is a number of from 1 to 2.

15. The process according to claim 1, wherein the —O—C(O)—$R^1$ ester of the alkyoxylated disaccharide is derived from a fatty acid selected from the group consisting of lauric acid, myrystic acid, palmitic acid, palmoleic acid, stearic acid, isostearic acid, oleic acid, elaidinic acid, linoleic acic, conjugated linoleic acid, linolenic acid, 12-hydroxy stearic acid, ricinoleic acid, gadoleic acid, arachidonic acid, behenic acid, erucic acid, and alkyl ester, or the mono-,di-, or tri-glycerides, of each fatty acid thereof.

16. The process according to claim 1, wherein the formation water has a salinity content of from 10,000 ppm to 100,000 ppm.

17. The process according to claim 1, wherein the alkyoxylated diaccharide at a concentration of 1 g/L in the aqueous formulation having a salinity of 10,000 ppm has an interfacial tension after 60 min of from 0.46 to 3.9 mN/m in decane.

18. A process for water-wetting an oil-wet surface, the process comprising
    contacting the oil-wet surface with an aqueous formulation comprising an alkyoxylated disaccharide, wherein the oil-wet surface is a surface of a rock of subterranean oil-bearing formations that includes oil and formation water having a salinity of from 10,000 ppm to 230,000 ppm, and the contacting includes injecting the aqueous formulation into the subterranean formation,
wherein the alkyoxylated disaccharide is an ester of an alkyoxylated disaccharide of formula (I)

$$Z-(-O-C(O)-R^1)_n \qquad (I)$$

wherein
Z represents an alkoxylated saccharose with 12 to 45 ethylene oxide, propylene oxide units, or ethylene oxide and propylene oxide units, with the proviso that at least 70% of the units are ethylene oxide units, and n is a number of 1 or 2,
$R^1$ is an aliphatic linear or branched, saturated or unsaturated hydrocarbon moiety having from 8 to 22 carbon atoms, optionally substituted with OH-groups, and
wherein the concentration of the alkyoxylated disaccharide in the aqueous formulation is from 0.1% by weight to 5% by weight.

19. The process according to claim 18, wherein the alkyoxylated disaccharide at a concentration of 1 g/L in the aqueous formulation having a salinity of 10,000 ppm has an interfacial tension after 60 min of from 0.46 to 3.9 mN/m in decane.

20. The process according to claim 18, wherein n is 2.

* * * * *